(12) United States Patent
Chen et al.

(10) Patent No.: US 7,655,589 B2
(45) Date of Patent: Feb. 2, 2010

(54) PROCESS AND APPARATUS FOR THE REGENERATION OF SPENT FCC CATALYST

(75) Inventors: Ye Mon Chen, Sugar Land, TX (US); David Jon Brosten, Anacortes, WA (US); Benjamin Karl Bussey, Houston, TX (US)

(73) Assignee: Shell Oil Company, Houston, TX (US)

( * ) Notice: Subject to any disclaimer, the term of this patent is extended or adjusted under 35 U.S.C. 154(b) by 224 days.

(21) Appl. No.: 11/612,187

(22) Filed: Dec. 18, 2006

(65) Prior Publication Data

US 2007/0248506 A1 Oct. 25, 2007

Related U.S. Application Data

(60) Provisional application No. 60/751,818, filed on Dec. 20, 2005.

(51) Int. Cl.
*B01J 38/30* (2006.01)
*B01J 38/04* (2006.01)
*B01J 38/12* (2006.01)
*B01J 8/18* (2006.01)
*F27B 15/00* (2006.01)

(52) U.S. Cl. .............................. 502/41; 502/34; 502/38; 422/139; 422/145; 422/146; 422/147

(58) Field of Classification Search .................... 502/34, 502/38, 41, 45, 46, 47, 52; 422/139, 145–147; 427/185, 213; 5/689
See application file for complete search history.

(56) References Cited

U.S. PATENT DOCUMENTS

| | | | | | |
|---|---|---|---|---|---|
| 4,107,851 | A | * | 8/1978 | Takacs et al. | 34/365 |
| 4,859,430 | A | * | 8/1989 | Julian et al. | 422/310 |
| 5,009,796 | A | * | 4/1991 | Petrik et al. | 210/787 |
| 5,139,649 | A | * | 8/1992 | Owen et al. | 208/113 |
| 5,198,397 | A | * | 3/1993 | Raterman | 502/43 |
| 5,202,294 | A | * | 4/1993 | Raterman | 502/43 |
| 2003/0143126 | A1 | | 7/2003 | Samson | 422/144 |

FOREIGN PATENT DOCUMENTS

GB 769818 3/1957

* cited by examiner

*Primary Examiner*—Jerry Lorengo
*Assistant Examiner*—Carlos Barcena
(74) *Attorney, Agent, or Firm*—William E. Hickman

(57) ABSTRACT

Disclosed is an improved regeneration process and system for the regeneration of a spent FCC catalyst in a regenerator without vertical partitions by introducing different fluidization gas streams to different regions of a dense phase catalyst zone at the lower end of the regenerator such as a high velocity central region and a low velocity annular zone are formed, positioned below a common dilute catalyst phase.

6 Claims, 2 Drawing Sheets

PROCESS AND APPARATUS FOR THE REGENERATION OF SPENT FCC CATALYST

This application claims the benefit of U.S. Provisional Application No. 60/751,818 filed Dec. 20, 2005, the entire disclosure of which is hereby incorporated by reference.

This invention relates to an improved process and apparatus or system for the regeneration of spent catalyst in the Fluid catalytic cracking (FCC) process.

Fluid catalytic cracking (FCC) processes are known processes used for the conversion of heavy hydrocarbon feedstock such as heavy crude oil distillate to lower molecular weight hydrocarbon products such as gasoline and middle distillate. An FCC process system typically includes a riser reactor, a stripper and a regenerator. A heavy hydrocarbon feedstock is introduced into the riser reactor wherein it is contacted with hot catalytic cracking catalyst particles from the regenerator. The mixture of the heavy hydrocarbon feedstock and catalytic cracking catalyst particles passes through the riser reactor wherein the cracked product is separated from the spent catalyst at the riser end. The separated cracked product passes to a downstream fractionation system and the spent catalyst passes through a stripping section, then to the regenerator where the coke deposited on the spent catalyst during the cracking reaction is burned off, via reactions with oxygen containing gas, to regenerate the spent catalyst. The resulting regenerated catalyst is used as the aforementioned hot catalytic cracking catalyst particles and is mixed with the heavy hydrocarbon feedstock that is introduced into the riser reactor.

U.S. Patent Publication US 2003/0143126 discloses a regenerator vessel that is suitable for the regeneration of spent FCC catalyst of an FCC process. Provided within the single regenerator vessel is a vertical partition that divides the fluidized bed zone at the lower end of the regenerator into an outer, fast fluidized bed zone of low density and an inner, dense fluidized bed zone of high density. Openings in the partition provide for the flow of catalyst from one zone to another zone. When the regenerator is in operation, the spent catalyst is introduced in the inner dense fluidized bed zone and regenerated catalyst is withdrawn from the outer fast fluidization zone. The bed level in the outer zone is typically higher than the level of the inner zone.

U.S. Pat. No. 5,198,397 discloses a process and apparatus for multiple-stage fluidized bed regeneration of FCC catalyst in a single regenerator vessel having a lower portion and an upper portion with the lower portion utilizing a vertical partition to provide for two separated dense phase fluidized beds, of similar fluidization conditions, disposed below a common dilute phase region. The spent catalyst is introduced in the first stage regenerator in the central region and overflows, via overflow windows in the vertical partition, into the second stage regenerator in the outer region where the regenerated catalyst is withdrawn. In addition, regenerated catalyst is also drawn from the outer region, via a standpipe, and discharged into the spent catalyst pick-up zone before entering the central region of the regenerator for initiating the regeneration reaction of spent catalyst in the first stage regeneration.

GB Patent Specification 769,818 discloses a catalytic cracking unit that includes a regenerator vessel equipped with a centrally built-in partition providing for a stripping space and a regenerating space within the bottom of the regenerator vessel. Catalyst flows from the stripping space into the surrounding regeneration space via openings in the bottom of the partition.

One object of the instant invention is to provide an improved process and apparatus for regenerating a spent catalytic cracking catalyst in an FCC process within an open section of a regenerator vessel and without the use of vertical baffling or partitioning structural elements.

Accordingly, provided is a process for the regeneration of a spent FCC catalyst utilizing a regenerator vessel having a lower end and an upper end, wherein said process comprises: forming, within said regenerator vessel, a dense phase catalyst zone, containing catalytic cracking catalyst particles, which is positioned at said lower end below a dilute phase catalyst zone positioned at said upper end; forming within said dense phase catalyst zone a high velocity central region and a low velocity annular region by introducing a high superficial velocity fluidization gas stream containing oxygen within said high velocity central region of said dense phase catalyst zone and by introducing a low superficial velocity fluidization gas stream containing oxygen into said low velocity annular region of said dense phase catalyst zone; introducing a spent catalytic cracking catalyst into said high velocity central region within said dense phase catalyst zone; removing a regenerated catalytic cracking catalyst from said low velocity annular region within said dense phase catalyst zone; and removing a flue gas from within said upper end of said regenerator vessel.

Figure 1:
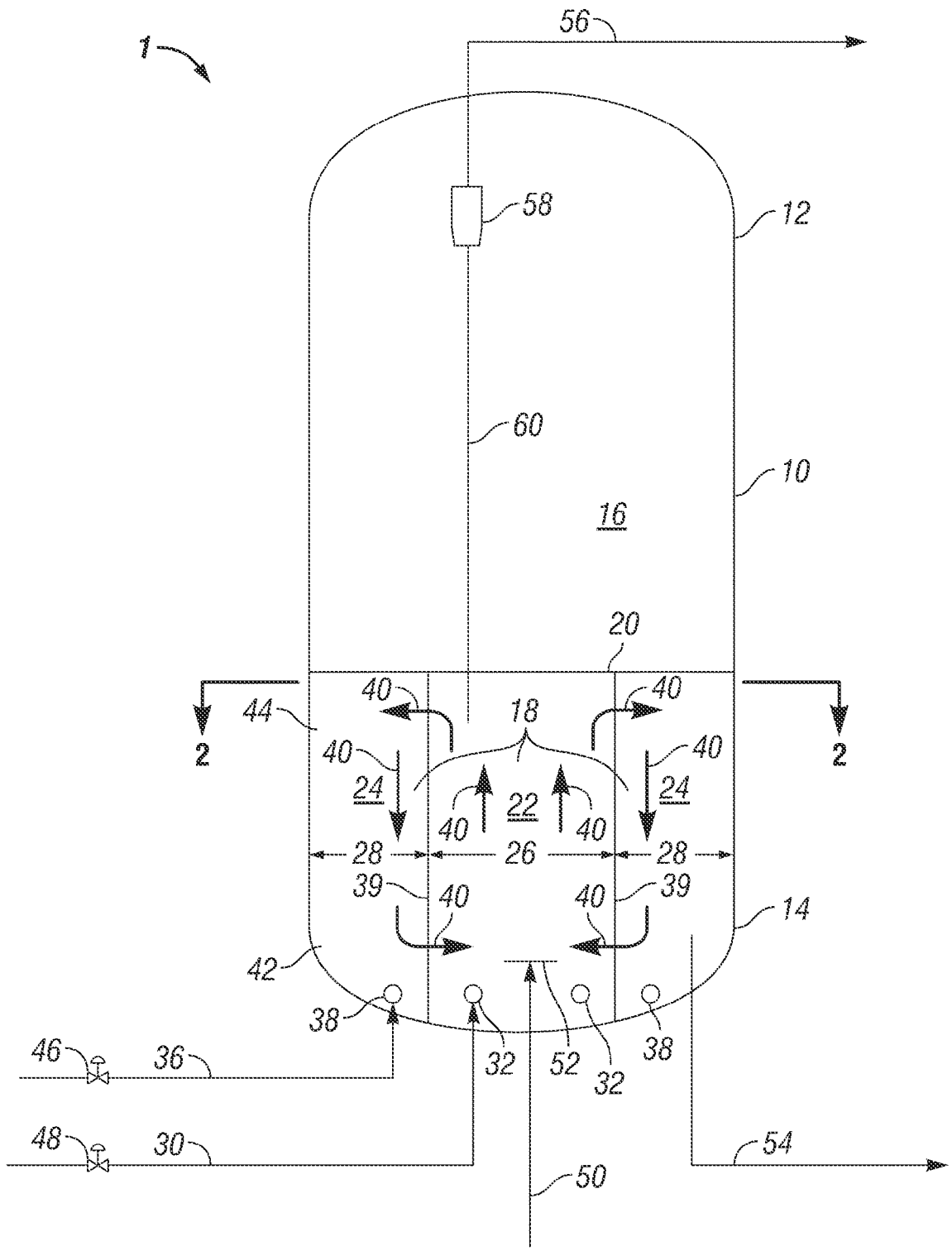
FIG. 1 is a schematic diagram illustrating features of an embodiment of the inventive regenerator process and apparatus.

The invention includes the use of a regenerator vessel. This regenerator vessel is generally cylindrical in shape, having a nominal length-to-diameter ratio in the range of from 0.5 to 10. In its upright position, the regenerator vessel has an upper end and a lower end with the regenerator vessel walls defining an open space or zone including or defining a dense phase catalyst zone and a dilute phase catalyst zone. The dense phase catalyst zone is positioned at the lower end of the regenerator vessel and may be defined by or coincide with a dense phase catalyst bed with its top surface, or a transition boundary, between the dense phase catalyst bed and a dilute catalyst phase of the dilute phase catalyst zone that is positioned at the upper end of the regenerator vessel above the dense phase catalyst zone.

The dilute phase catalyst zone contains a dilute catalyst phase comprising a mixture of regeneration effluent gases, resulting from the burning of coke deposition on the spent FCC catalyst within the dense phase catalyst zone, and entrained FCC catalyst particles from the dense phase catalyst zone. The dilute catalyst phase passes from the dilute phase catalyst zone through separation means, such as a cyclone or several cyclones in series or any other centrifugal separator device, for separating the entrained FCC catalyst particles from the regeneration effluent gases and for returning the separated catalyst particles to the dense phase catalyst zone at the lower end. The dilute catalyst phase is dilute in the sense that it has a low catalyst density with the average density of the dilute catalyst phase typically in the range of from 8 kg/m$^3$ (0.5 lb/ft$^3$) to 160 kg/m$^3$ (10 lb/ft$^3$).

The dense phase catalyst zone contains a dense catalyst phase comprising a mixture of spent catalyst, regenerated catalyst, and partially regenerated catalyst, oxygen containing gas and regeneration effluent gases resulting from the burning of coke deposition on the spent FCC catalyst within the dense phase catalyst zone. The dense catalyst phase is dense in the sense that it has a high catalyst density with the average density of the dense catalyst phase in the range of from 160 kg/m$^3$ (10 lb/ft$^3$) to 900 kg/m$^3$ (56 lb/ft$^3$) and, preferably, from 240 kg/m$^3$ (15 lb/ft$^3$) to 800 kg/m$^3$ (50 lb/ft$^3$).

It is a significant aspect of the invention that in the operation of the regenerator system more than one fluidization region is formed in the dense phase catalyst zone without the use of structural elements such as a vertical partition or a baffle. Rather, the dense phase catalyst zone is open and has an absence of vertical partition means or baffle means or other similar types of structural elements for separating the dense phase catalyst zone into the more than one fluidization region. But, nevertheless, the invention provides for the formation within the dense phase catalyst zone of at least two separate fluidization regions, without a vertical structural element separating such separate fluidization regions, by the controlled and directed introduction of multiple fluidization gas streams into different locations of the dense phase catalyst zone in a manner so as to form the multiple fluidization regions.

In one embodiment of the invention, as illustrated in FIG. 1, a high velocity central region and a low velocity annular region are formed within the dense phase catalyst zone by introducing in a controlled and directed manner a high superficial velocity fluidization gas stream within the central portion of the dense phase catalyst zone and by introducing in a controlled and directed manner a low superficial velocity fluidization gas stream into the annular portion of the dense phase catalyst zone. Each of the fluidization gas streams (i.e., the high superficial velocity fluidization gas stream and the low superficial velocity fluidization gas stream) is controlled or adjusted or affixed so as to provide for the formation of the fluidization regions of a high velocity central region in the central portion of the dense phase catalyst zone and a low velocity annular region in the annular portion of the dense phase catalyst zone, As earlier noted, the location at which and method and means by which the fluidization gas streams are introduced into the central portion and annular portion of the dense phase catalyst zone are important aspects of the invention in that they provide for the formation of the separate fluidization conditions of the high velocity central region and the low velocity annular region.

The high superficial velocity fluidization gas stream is introduced into the central portion of the dense phase catalyst zone by high velocity gas introduction means for passing a fluidization gas into a zone at a high superficial velocity. This high velocity gas introduction means can be any suitable means that provides for the controlled and directed flow of a gas stream into the central portion of the dense phase catalyst zone close to the bottom of the regenerator vessel wall. Examples of such means include conduits for directing the flow of a fluid, fluid distribution grids, having, for example, pipes with lateral conduits extending therefrom, pipes with nozzles, manifold systems, and fluid distribution rings. A preferred high velocity gas introduction means includes one or multiple fluidization gas rings, comprising conduits or pipes provided with nozzles or apertures and surrounding an area within the central portion of the dense phase catalyst zone, that provides for the directed introduction of the high superficial velocity fluidization gas stream. The high velocity central region further includes a bottom end and a top end wherein the bottom end is in the vicinity of the high velocity gas introduction means and the top end is in the vicinity of the dense phase catalyst bed top surface.

The low superficial velocity fluidization gas stream is introduced into the annular portion of the dense phase catalyst zone by low velocity gas introduction means for passing a fluidization gas into a zone at a low superficial velocity. The low velocity gas introduction means can be any suitable means that provides for the controlled and directed flow of a gas stream into the annular portion of the dense phase catalyst zone. As with the high velocity gas introduction means, the low velocity gas introduction means also can be selected from those that include conduits for directing the flow of a fluid, fluid distribution grids, having, for example, pipes with lateral conduits extending therefrom, pipes with nozzles, manifold systems, and fluid distribution rings. A preferred low velocity gas introduction means includes one or more fluidization gas ring, comprising conduits or pipes provided with nozzles or apertures and surrounding an area within the annular portion of the dense phase catalyst zone close to the bottom of the regenerator vessel wall, that provides for the directed introduction of the low superficial velocity fluidization gas steam. The low velocity annular region further includes a bottom end and a top end wherein the bottom end is in the vicinity of the low velocity gas introduction means and the top end is in the vicinity of the dense phase catalyst bed top surface.

The rate at which the high superficial velocity fluidization gas stream is introduced into the central portion of the dense phase catalyst zone is such that it has a high superficial gas velocity in the range of from 2 feet per second (2 ft/s) to 20 ft/s, and more preferably from 3 ft/s to 10 ft/s, and the rate at which the low superficial velocity fluidization gas stream is introduced into the annular portion of the dense phase catalyst zone is such that it has a low superficial gas velocity in the range of from 0.1 ft/s to 3 ft/s and more preferably from 0.3 ft/s to 2 ft/s. As the term is used herein, superficial gas velocity means the volumetric flow rate of the fluidization gas stream at process conditions (i.e., regenerator dense bed temperature and local hydrostatic pressure) divided by the cross sectional area of the particular fluidization region (i.e., the central region or the annular region) into which the fluidization gas stream is introduced. The fluidization gas stream is, preferably, an oxygen-containing stream, such as air or oxygen-enriched air.

The dense phase catalyst zone has a cross sectional area as defined by that of the regenerator vessel at its lower end. The dense phase catalyst zone includes both the high velocity central region and the low velocity annular region each of which is defined by the characteristic velocities (rate and direction) of the catalyst particles and fluidization gas that pass through the particular region of the dense phase catalyst bed. In the high velocity central region, the bulk flow of the catalyst particles is generally in the upwardly direction and in the same direction as the fluidization gas flow. What is meant as the flow being in the upwardly direction is that it is in the direction opposite to gravity. In the low velocity annular region, the bulk flow of the catalyst particles is generally in the downwardly direction and in the direction opposite to that of the fluidization gas flow. The term downwardly direction means flow that is in the same direction as gravity.

The boundary between the high velocity central region and the low velocity annular region of the dense phase catalyst bed is set by the geometry and placement of the various fluidization means, the velocity of the high superficial velocity fluidization gas stream, and the velocity of the low superficial velocity fluidization gas stream. In the preferred embodiment of the invention, the fluidization gas streams are introduced into the central portion and into annular portion, respectively, by use of multiple fluidization gas conduits with each being in the form of one or more rings that provide means for introducing or injecting a fluidization gas stream into the respective portion of the dense phase catalyst zone. The boundary defining the two fluidization regions is approximately located at the middle point between the gas distribution ring for introducing the high superficial velocity fluidization gas stream to the high velocity central region and the gas distribution ring for introducing the low superficial velocity fluidization gas stream to the low velocity annular region.

The dense phase catalyst bed, including the high velocity central region and the low velocity annular region, will adjust itself such that it is hydraulically balanced. When the system is in balance, the relative gas-to-solids velocities in the high velocity central region and the low velocity annular region are substantially equivalent and the dense phase catalyst bed density is relatively uniform. Provided in the following Table 1 are numbers for illustrating this phenomenon.

TABLE 1

An example of solids and gas flows within the two regions of the dense phase catalyst zone of the inventive process.

| | Central region velocities (Feet per second) | Annular region velocities (Feet per second) |
|---|---|---|
| Solids flow | +4.5 | −1.5 |
| Gas flow | +7.5 | +1.5 |
| Solids-to-gas relative velocity (gas flow less solids flow) | +3 | +3 |

In this example, the ratio of the high velocity central region cross sectional area to the cross sectional area of the dense phase catalyst zone is approximately 0.33. As may be seen from the information presented in Table 1, the solids-to-gas relative velocities in the two regions that make up the dense phase catalyst zone are equivalent and the density of the dense phase catalyst zone in the two regions is relatively uniform. The solids flow in the central region is in the positive (upwardly) direction and the solids flow in the annular region is in the negative (downwardly) direction. The gas flows in both regions are positive (upwardly), but they have different rates. The relative velocities of the solids-to-gas in each of the regions are determined by subtracting the solids velocity from the gas velocity. The cross sectional areas of the two regions are such that the amount of catalyst circulating from within the central region into the annular region and the amount of catalyst circulating from within the annular region into the central region are substantially equal.

The relative cross sectional areas of the high velocity central region cross sectional area and the low velocity annular region cross sectional area are important to the proper combustion of coke that is deposited on the spent FCC catalyst of the dense phase catalyst bed and the reduction of $NO_x$ combustion products in the flue gas. In general, the ratio of the high velocity central region cross sectional area to the cross sectional area of the dense phase catalyst zone is in the range of from 0.05 to 0.5. Preferably, this ratio is in the range of from 0.1 to 0.4, and, most preferably, from 0.2 to 0.35. The ratio of the low velocity annular region cross sectional area to the cross sectional area of the dense phase catalyst zone is in the range of from 0.5 to 0.95. Preferably, this ratio is in the range of from 0.6 to 0.9, and, most preferably, from 0.65 to 0.8

Figure 2:
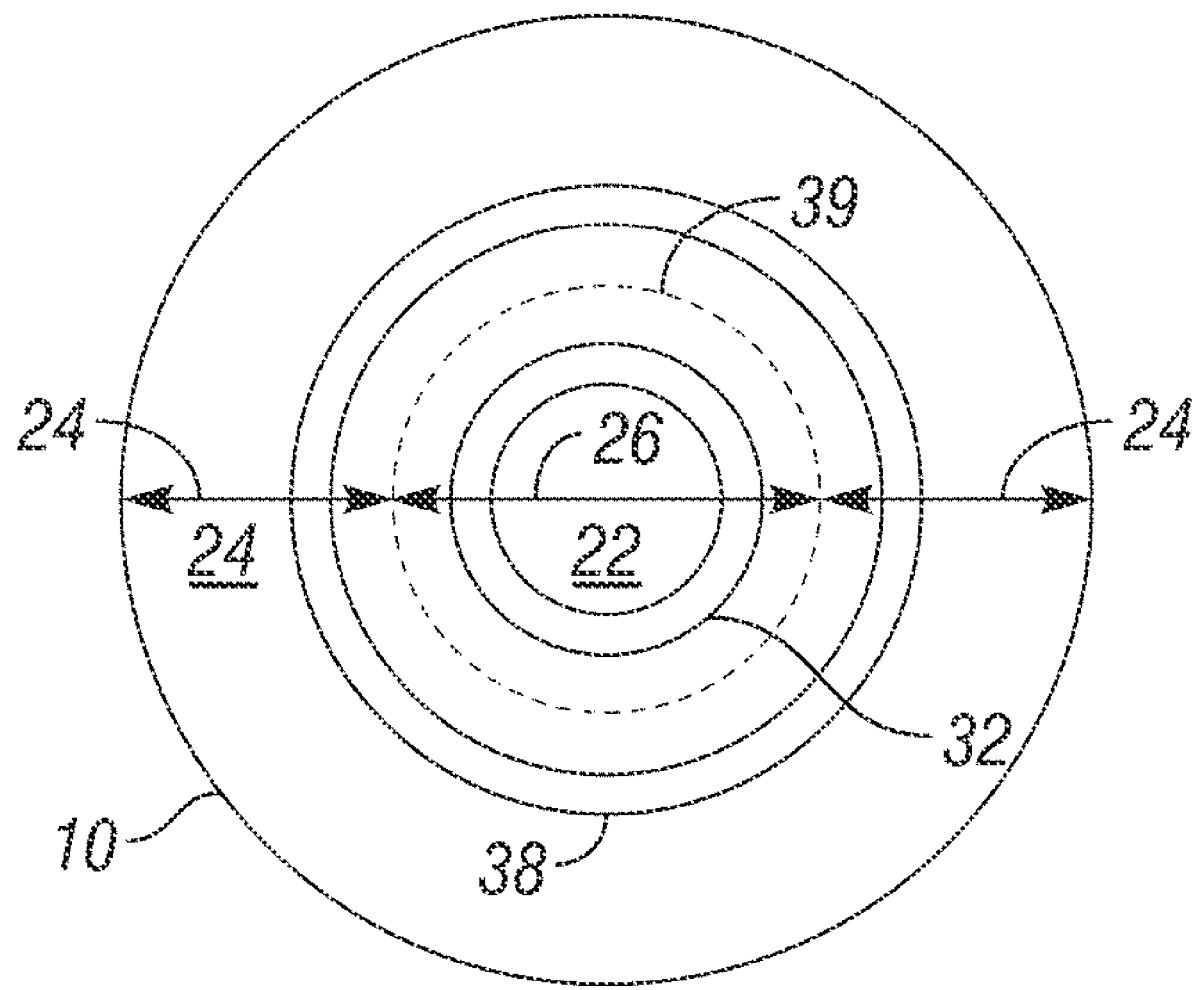
FIG. 2 is a sectional view along section 2-2 as shown in FIG. 1.

To achieve the desired superficial velocities within the particular fluidization regions, the volumetric flow rates and the introduction or injection locations of the fluidization gas streams are controlled so as to provide for the formation of the multiple fluidization regions having the certain boundary or boundaries that demark or define such fluidization regions. In one embodiment of the invention that utilizes one gas distribution ring for introducing the high velocity fluidization gas stream into the central portion and one gas distribution ring for introducing the low velocity fluidization gas stream into the annular portion, as shown in FIG. 2, the boundary that demarks the high velocity central region and the low velocity annular region is located at the middle point between the inner ring position and the outer ring position. The volumetric flow rate of the high superficial velocity fluidization gas stream may be higher or lower than the volumetric flow rate of the low superficial velocity fluidization gas stream. However, it is understood that in the operation of the inventive process, the superficial velocity of the high superficial velocity fluidization gas stream introduced into the high velocity central region is greater than the superficial velocity of the low superficial velocity fluidization gas stream introduced into the low velocity annular region.

In the embodiment of the invention that uses two gas distribution rings, one of which is for introducing the high velocity fluidization gas stream and the other of which is for introducing the low velocity fluidization gas stream, the high velocity central region cross sectional area is that area defined or encompassed by the middle point between the inner ring and the outer ring positions, as shown in FIG. 2. The low velocity annular cross sectional area is that area as determined by the difference between the cross sectional area of the dense phase catalyst zone and the high velocity central region cross sectional area. In the situation where the gas distribution rings may approximately be represented as two circles, the inner ring can be represented as having a central radius ($R_c$), the outer ring can be represented as having an annulus radius ($R_a$), and the dense phase catalyst zone can be represented as having a vessel radius ($R_v$). The middle point between the inner ring and the outer ring has a middle point radius ($R_m$), which is equal to the sum of the central radius and the annulus radius divided by two (($R_a+R_c$)/2). With knowledge of the radius of the middle point and of the dense phase catalyst zone, each of the high velocity central region cross sectional area ($=\pi R_m^2$), the low velocity annular region cross sectional area ($=\pi(R_v^2-R_m^2)$), and the dense phase catalyst zone cross sectional area ($=\pi R_v^2$) can be determined. The desired ranges for the relative cross sectional areas of the high velocity central region and the low velocity annular region are those as discussed above. In the embodiment of the invention that uses multiple gas distribution rings in each of the high velocity central region and the low velocity annular region, respectively, the central radius ($R_c$) should be the radius of the largest of the air rings for introducing the high velocity fluidization gas stream whereas the annulus radius ($R_a$) should be the radius of the smallest of the air rings for introducing the low velocity fluidization gas stream It is understood that the placement of the gas distribution rings within the regenerator vessel are such that the perimeter of one of the distribution rings is positioned within the perimeter of another distribution ring of the next size larger. In the case where the gas distribution rings may have a geometry that is approximately circular, it is not a requirement that the distribution rings be concentrically positioned with them having a common center; and, thus, each distribution ring may have a different center resulting in the distribution rings being offset, or they may have a common center. It is also understood that the gas distribution rings are not required to have a geometry that is circular, but they may have an elongated shape such as that of an ellipse or an oval or even a square.

The inventive regenerator system and process further provides for the introduction of the spent FCC catalyst into the dense phase catalyst zone wherein it is contacted under combustion conditions with the fluidization gas streams containing oxygen so as to burn therefrom the coke or hydrocarbon that is deposited on the spent FCC catalyst. Various suitable spent catalyst introduction means at the end of either a spent catalyst riser or a spent catalyst standpipe for introducing a spent FCC catalyst into the dense phase catalyst zone can be used. It is, however, a preferred embodiment of the invention for the spent catalyst introduction means to provide for the introduction of the spent catalyst into the high velocity central region of the dense phase catalyst zone. It is a further preferred feature of the invention for the spent FCC catalyst to be introduced into the bottom end of the high velocity central region of the dense phase catalyst zone by way of a catalyst conduit, which as already noted is either a spent catalyst riser or a spent catalyst standpipe, having operatively connected thereto an end distribution means for conveying and introducing spent FCC catalyst into the dense phase catalyst zone in a generally horizontal direction, and to be mixed with catalyst circulating from the low velocity annular region to the high velocity central region A spent catalyst riser is, generally, a conduit providing for the conveyance of spent FCC catalyst from outside the high velocity central region, particular from outside the regenerator vessel, and for the introduction of the spent FCC catalyst into the high velocity central region. In the spent catalyst riser, the flow of the spent FCC catalyst is in a generally upwardly direction against gravity and the spent FCC catalyst is moved or conveyed usually by the use of a lifting gas. A spent catalyst standpipe, on the other hand, provides for the conveyance and introduction of spent FCC catalyst into the high velocity central region by use of gravity flow instead of a lift gas. Thus, in the spent catalyst standpipe, the spent FCC catalyst flows in the generally downwardly direction of gravity from outside the regenerator and it is introduced into the high velocity central region. The spent catalyst riser may be operated with a lift gas air rate that provides a significant fraction of the total amount of combustion air for the regeneration of the spent FCC catalyst. In one embodiment of the invention in which the spent catalyst riser delivers spent FCC catalyst and air into the high velocity central region, the total amount of air introduced into the high velocity central region is the sum of the amounts introduced by way of the spent catalyst riser and by way of the other means of introducing fluidization gas into the high velocity central region, such as, by a distribution ring or rings.

Regenerated FCC catalyst can be removed from the low velocity annular region of the dense phase catalyst zone by the use of one or more regenerated catalyst removal conduits that are in fluid communication with the low velocity annular region and provides regenerated catalyst removal means for removing a regenerated FCC catalyst from the low velocity annular region of the dense phase catalyst zone and transferring it to a location that is external to the regenerator vessel. Also, a flue gas removal conduit that is in fluid communication with the dilute phase catalyst zone provides for the removal of regeneration gases or effluent from the upper end of the regenerator vessel to a location that is external to the regenerator vessel.

Referring now to FIG. 1 that presents a schematic diagram that illustrates various features of one embodiment of the inventive regenerator system 1 and process. The inventive regenerator system 1 includes a regenerator vessel 10 having an upper end 12 and a lower end 14. The regenerator vessel 10 defines an open zone, which includes a dilute phase catalyst zone 16 and a dense phase catalyst zone 18. The dense phase catalyst zone 18 is positioned within the regenerator vessel 10 at its lower end 14 with the dilute phase catalyst zone 16 being positioned at the upper end 12 of regenerator vessel 10 directly above the dense phase catalyst zone 18.

For purposes of illustration, the dense phase catalyst zone 18 coincides with a dense phase catalyst bed and is treated in the description herein as being one and the same and the dilute phase catalyst zone 16 coincides with a dilute catalyst phase. The dense phase catalyst zone (dense phase catalyst bed) 18 has a surface 20, which is the transition boundary between the dense phase catalyst zone 18 and the dilute phase catalyst zone 16. While, as it is presented in FIG. 1, the surface 20 is shown as being a distinct and precisely defined boundary, more likely, the surface is an indiscrete boundary that transitions from the dense phase catalyst zone 18 to the dilute phase catalyst zone 16. Furthermore, as it is presented in FIG. 1, the surface 20 is shown as being flat, but it is more likely that the surface 20 is not completely flat due to the differences in the superficial gas velocities of the fluidization gas streams introduced into the dense phase catalyst zone 18.

The dense phase catalyst zone 18 includes at least two separate fluidization regions that are distinguishable from each other by having distinctly different flow conditions. The dense phase catalyst bed 18 as depicted in FIG. 1 includes a high velocity central region 22 and a low velocity annular region 24. The high velocity central region 22 is located in the central portion 26 of the dense phase catalyst zone 18 and the low velocity annular region 24 is located in the annular portion 28 of the dense phase catalyst zone 18.

It is a significant aspect of the invention that the high velocity central region 22 and the low velocity annular region 24 are formed within the dense phase catalyst zone 18 without the use of a structural element such as a vertical baffle or a partition for the purpose of maintaining the separation of the two fluidization regions. The two fluidization regions are instead formed within the dense phase catalyst zone 18 by the introduction into the dense phase catalyst zone 18 of more than one fluidization gas stream, each of which is directed and controlled in such a manner as to cause the formation of the multiple fluidization regions. Thus, introduced into the central portion 26 of the dense phase catalyst zone 18 is a high superficial velocity fluidization gas stream that passes by way of conduit 30 to fluidization gas distribution ring 32 near the bottom of regenerator vessel 10. The fluidization gas distribution ring 32 provides high velocity gas introduction means for passing a high superficial velocity fluidization gas stream into the central portion 26. The fluidization gas is preferably an oxygen-containing gas such as air or oxygen-enriched air.

Introduced into the annular portion 28 of the dense phase catalyst zone 18 is a low superficial velocity fluidization gas stream that passes by way of conduit 36 to fluidization gas distribution ring 38 located within the annular portion 28 near the bottom of regenerator vessel 10. The fluidization gas distribution ring 38 provides low velocity introduction means for passing a low superficial fluidization gas stream into the annular portion 28. The fluidization gas is preferably an oxygen-containing gas such as air or oxygen-enriched air. The middle point between fluidization gas distribution ring 32 and fluidization gas distribution ring 38 is the vertical boundary 39 of the central portion 26 and the annular portion 28.

In the operation of the regenerator system 1, the fluidization gas streams are introduced into the central portion 26 and the annular portion 24 in such a manner and at such a location and flow rate as to induce the formation of the multiple fluidization regions. The high superficial velocity fluidization gas stream is introduced into the central portion 26 at a flow rate that provides for a high superficial gas velocity, as defined elsewhere herein, in the range of from 2 feet per second (2 ft/s) to 20 ft/s, and more preferably from 3 ft/s to 10 ft/s, and the low superficial velocity fluidization gas stream is introduced into the annular portion 28 at a flow rate that provides for a low superficial gas velocity in the range of from 0.1 ft/s to 3 ft/s and more preferably from 0.3 ft/s to 2 ft/s. The controlled introduction of the various fluidization gas streams at the different fluidization gas flow rates along with the directed introduction of the fluidization gas streams to desired locations provide for the desired circulation of the FCC catalyst within the dense phase catalyst zone 18.

The circulation of the FCC catalyst is depicted in the FIG. 1 by the bold arrows 40 that show the general direction and circulation of the FCC catalyst within the dense phase catalyst zone 18. As shown by the bold arrows 40, catalyst particles in the high velocity central region move in a generally upward direction, and catalyst particles in the low velocity annular region move in a generally downward direction. Catalyst from the bottom end 42 of the low velocity annular region 24 flows into the high velocity central region 22 and most of catalyst from the top end 44 of the high velocity central region 22 flows into the low velocity annular region 24 thereby forming the catalyst circulation within the dense phase catalyst zone 18. This catalyst circulation is an important feature of the operation of the regenerator system 1 and provides for some of the advantages of the invention.

As it is shown in FIG. 1, the vertical boundary 39 between the high velocity central region 22 and the low velocity annular region 24 is located at the middle point between the fluidization gas distribution ring 32 and the fluidization gas distribution ring 38.

FIG. 2 presents a cross sectional view taken along the plane shown in FIG. 1 as section 2-2 of a cylindrically shaped regenerator vessel 10, and it illustrates an embodiment of the invention that provides for the formation of multiple fluidization regions by use of two fluidization gas distribution rings. Shown in FIG. 2 is the wall of vessel 10 that encompasses a cross sectional area and defines the outer boundary of the dense phase catalyst zone 18. Within the cross sectional area are the fluidization gas distribution ring 32 that is circular in shape and having a radius $R_c$ and the fluidization gas distribution ring 38 that is circular in shape and having a radius $R_a$. The high velocity central region 22 is that area defined by the vertical boundary 39, which approximates the middle point between the locus of fluidization gas distribution ring 32 and the locus of fluidization gas distribution ring 38. The high velocity central region 22 may further be depicted as having an approximate diameter of that of the vertical boundary 39. The low velocity annular region 24 is the annulus area defined by the difference in the total cross-sectional area defined by the wall of the vessel 10 and the area defined by the vertical boundary 39.

Interposed in conduit 36 is a control valve 46 that provides control means for controlling the flow rate of the low velocity fluidization gas stream to the annular portion 28 of the dense phase catalyst zone 18. Interposed in conduit 30 is a control valve 48 that provides control means for controlling the flow rate of the high velocity fluidization gas stream to the central portion 26 of the dense phase catalyst zone 18. In addition to using control means, such as control valves and the like, for controlling the rate of introduction of fluidization gas streams into the dense phase catalyst zone 18, the fluidization gas distribution ring 32, fluidization gas distribution ring 38, and any other gas distribution means known to those skilled in the art can provide further control of the distribution of the fluidization gas streams.

Spent catalytic cracking catalyst is introduced into the high velocity central region 22 through conduit 50. While a riser is shown in FIG. 1, the spent catalyst conduit 50 can, alternatively, be a standpipe (not shown). A standpipe is a conduit that provides for fluid communication between the central portion 26 and a location external to regenerator vessel 10 arranged so as to provide gravity flow of spent catalyst into the central portion 26. Operatively connected to the end of conduit 50 is end distribution means 52 that provides for introducing spent catalytic cracking catalyst into the high velocity central region 22. In a preferred embodiment of the invention, the end distribution means 52 provides for discharging, in a generally horizontal direction, spent catalytic cracking catalyst into the bottom end of the high velocity central region 22 and mixing with catalyst circulating from the bottom end 42 of the low velocity annular region 24.

Combustion of the coke or carbon that has been deposited on the spent FCC catalyst occurs within the dense phase catalyst zone 18 to thereby provide a regenerated catalytic cracking catalyst and regeneration effluent gases. This regenerated catalytic cracking catalyst is removed from the low velocity annular region 24 by way of conduit 54, which provides regenerated catalyst removal means for removing a regenerated catalytic cracking catalyst from the annular portion 28 of the dense phase catalyst zone 18.

The regeneration effluent gases resulting from the combustion of the coke deposited on the spent FCC catalyst pass from the dense phase catalyst zone 18 and into the dilute phase catalyst zone 16. Flue gas is removed from the regenerator vessel 10 by way of conduit 56, which provides flue gas removal means for removing a flue gas from the regenerator vessel 10. The conduit 56 is operatively connected in fluid communication with a separation means such as a cyclone 58, or several cyclones in series or any other centrifugal separator device, that provides for the separation of entrained FCC particles of the dilute phase catalyst from the dilute phase catalyst zone 16 and returning the separated particles to the dense phase catalyst zone 18 through conduit 60.

One advantage of the invention is that the provided catalyst circulation pattern separates the spent catalyst inlet within the high velocity central region 22 from the regenerated catalyst outlet within the low velocity annular region 24, thus providing a process for more complete regeneration of spent catalyst, but without the use of structural elements such as a vertical baffle or partition as required by the prior art. Another advantage of the invention is that the catalyst circulation pattern of the invention provides for the mixing with incoming spent catalyst and the initiation of catalyst regeneration reactions, but without the use of an external recycle loop via an additional standpipe, as disclosed in U.S. Pat. No. 5,198, 397. Yet another advantage is that the catalyst circulation pattern distributes partially regenerated spent catalyst to the proximity of the surface 20, which results in reducing $NO_x$ emissions in the regeneration of spent FCC catalyst.

That which is claimed is:

1. A process for the regeneration of a spent FCC catalyst utilizing a regenerator vessel having a lower end and an upper end, wherein said process comprises:

forming, within said regenerator vessel, a dense phase catalyst zone, containing catalytic cracking catalyst particles, which is positioned at said lower end below a dilute phase catalyst zone positioned at said upper end;

forming within said dense phase catalyst zone a high velocity central region and a low velocity annular region by introducing a high superficial velocity fluidization gas stream containing oxygen within said high velocity central region of said dense phase catalyst zone and by introducing a low superficial velocity fluidization gas stream containing oxygen into said low velocity annular region of said dense phase catalyst zone;

introducing a spent catalytic cracking catalyst into said high velocity central region within said dense phase catalyst zone;

removing a regenerated catalytic cracking catalyst from said low velocity annular region within said dense phase catalyst zone; and removing a flue gas from within said upper end of said regenerator vessel;

wherein, there is an absence within said dense phase catalyst zone of vertical partition means for separating said high velocity central region and said low velocity annular region.

2. A process as recited in claim 1, further comprising: controlling both the introduction of said high superficial velocity fluidization gas stream into said central region to provide a high superficial velocity and the introduction of said low superficial velocity fluidization gas stream into said annular region to provide a low superficial velocity in a manner so as to form said high velocity central region and said low velocity annular region within said dense phase catalyst zone.

3. A process as recited in claim 1, wherein said dense phase catalyst zone is defined by said high velocity central region and said low velocity annular region, wherein said high velocity central region having catalyst particles moving in a generally upward direction, and wherein said low velocity annular region having catalyst particles moving in a generally downward direction whereby circulation of the catalytic cracking catalyst particles within said dense phase catalyst zone is induced.

4. A process as recited in claim 1, wherein said high velocity central region has a central region cross sectional area such as to provide a high superficial gas velocity in the range of from 3 feet/sec to 15 feet/sec to said high velocity central region, and said low velocity annular region has an annular region cross sectional area such as to provide a low superficial gas velocity in the range of from 0.3 feet/sec to 2 feet/sec to said the annular region.

5. A process as recited in claim 1, wherein said dense phase catalyst zone has a dense phase catalyst zone cross sectional area as defined by said regenerator vessel, and wherein the ratio of said high velocity central region cross sectional area to said dense phase catalyst zone cross sectional area is in the range of from 0.1 to 0.5, and wherein the ratio of said low velocity annular region cross sectional area to said dense phase catalyst zone cross sectional area is in the range of from 0.5 to 0.9.

6. A process as recited in claim 1, wherein said high velocity central region includes a bottom end and a top end, and wherein said spent catalytic cracking catalyst of said introducing step is introduced into said bottom end of said high velocity central region and mixed with catalyst circulating from said low velocity annular region into said high velocity central region within said dense phase catalyst zone.

* * * * *